Feb. 25, 1941.  C. A. VRATIL  2,233,331
DAMMING ATTACHMENT FOR PLOWS
Filed Dec. 28, 1939  2 Sheets-Sheet 1

Inventor
Charles A. Vratil
By L. F. Randolph
Attorney

Patented Feb. 25, 1941

2,233,331

UNITED STATES PATENT OFFICE 2,233,331

DAMMING ATTACHMENT FOR PLOWS

Charles A. Vratil, Pawnee Rock, Kans.

Application December 28, 1939, Serial No. 311,425

8 Claims. (Cl. 97—6)

This invention relates to an attachment for use with moldboard plows for damming the soil behind a plow or plows to form spaced dams in a furrow for holding moisture and surface water.

More particularly, it is an aim of this invention to provide an attachment of simple construction which may be economically manufactured and sold and which may be readily applied to or removed from a plow standard, and adjustably mounted relatively to a plowshare.

Still another aim of the invention is to provide a dammer actuated by the soil from a moldboard for forming spaced dams in a furrow and which operates automatically to form the spaced ridges or dams.

Figure 1:
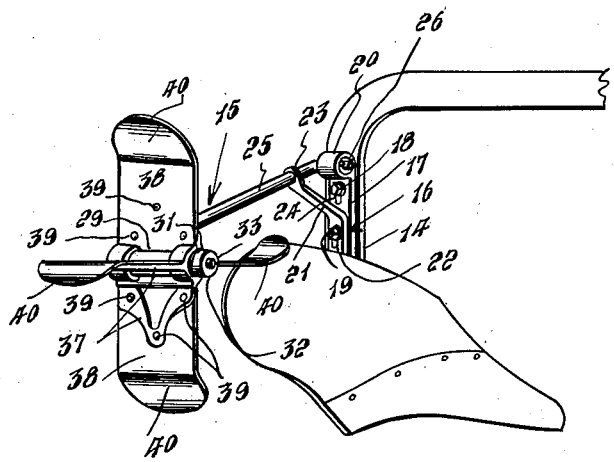

Other objects and advantages of the invention will hereinafter become more fully apparent from the following description of the drawings, which illustrate a preferred embodiment thereof, and wherein:

Figure 1 is a side elevational view of a plow with the attachment, comprising the invention, applied thereto and shown in perspective.

Figure 2:
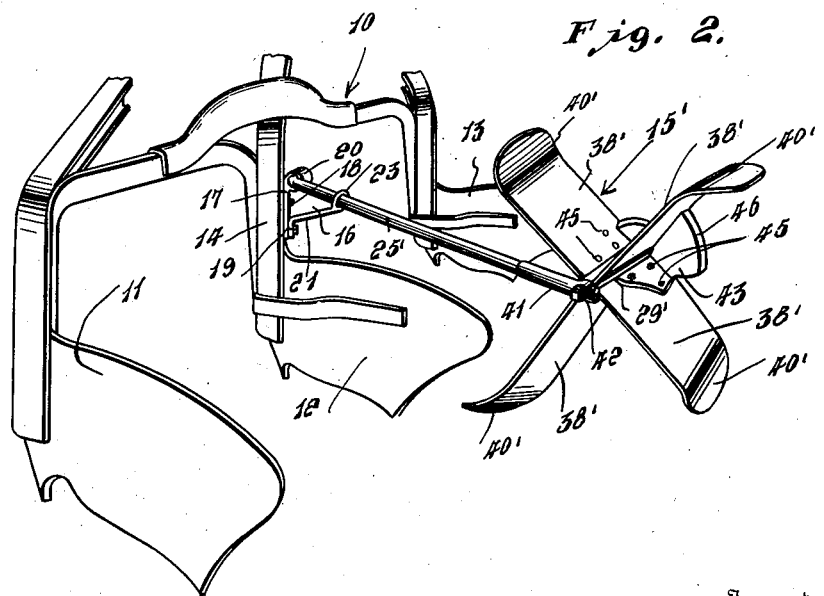
Figure 3:
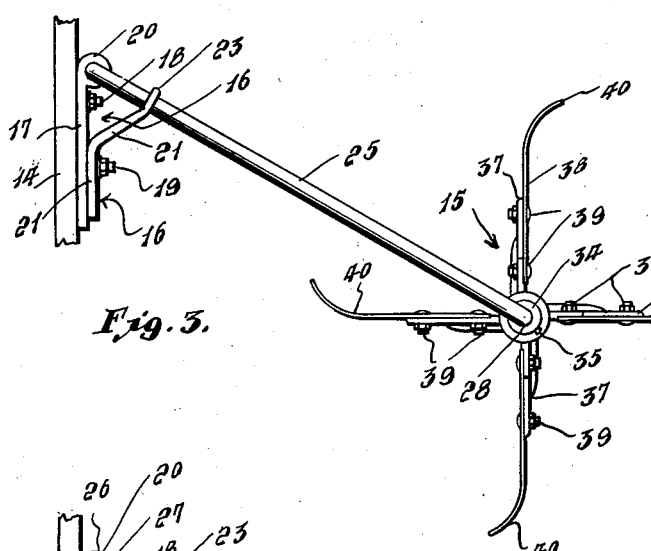
Figure 4:
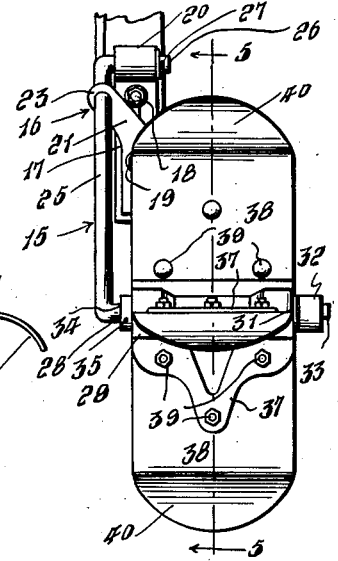
Figure 5:
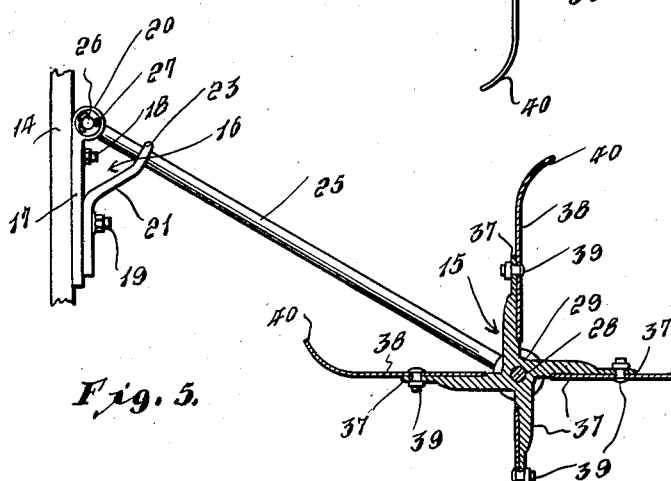
Figure 6:
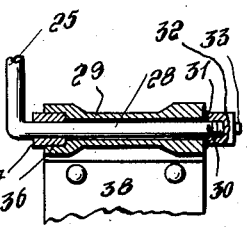
Figure 7:
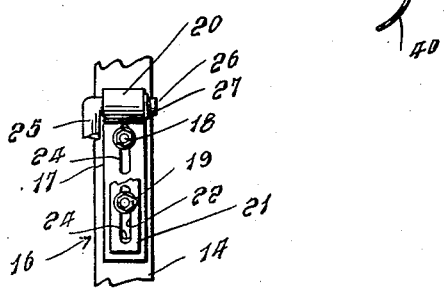

Figure 2 is a rear elevational view of a plow with the attachment applied thereto and shown in perspective, Figure 3 is a side elevational view of the dammer, Figure 4 is an end view in elevation of the same, Figure 5 is a vertical sectional view taken substantially along the plane of the line 5—5 of Figure 4, Figure 6 is a fragmentary elevational view, partly in section, showing the bearing of the blades mounted on the axle portion of the arm, and Figure 7 is a fragmentary view partly in section and partly in elevation showing the bracket for connecting the dammer to a plow standard.

Referring more particularly to the drawings, wherein like reference characters designate like or corresponding parts throughout the different views, 10 designates generally a portion of a gang plow having the three plowshares 11, 12 and 13 which are disposed in oblique alinement relatively to the direction of movement of the gang plow 10 with the share 13 disposed forwardly of the shares 11 and 12. The middle share 12 is supported by the plow standard 14. These parts are of conventional construction and have been illustrated and described merely to better illustrate the application of the damming attachment, designated generally 15, and comprising the invention. The damming attachment 15 includes a bracket, designated generally 16, comprising a strap 17 which is secured to the standard 14 by the fastenings 18 and 19. The strap 17 at its upper end is provided with the loop 20. A brace 21, forming the other portion of the bracket 16, has a slot 22 in one of its ends to loosely engage the bolt of the fastening 19, said end being disposed against the outer side of the strap 17. The opposite end of the brace 21 is bent to project outwardly and upwardly at an oblique angle to the standard 14 and is provided at its free end with an opening 23, for a purpose which will hereinafter be described. As best seen in Figure 7, the strap 17 is provided with two longitudinally disposed slots 24 in which the bolts of the fastenings 18 and 19 are loosely disposed. It will thus be seen, that the strap 17 may be adjusted vertically relatively to the standard 14 and the brace 21 may likewise be adjusted vertically relatively to the standard and also to the strap 17.

A supporting arm 25 has an angularly disposed end 26 which is journaled in the bearing 20 of the strap 17 and which is detachably connected thereto by means of a cotter pin, or other suitable fastening, 27 which is mounted in an opening, not shown, in the terminal end of the portion 26. The intermediate portion of the arm 25 extends through the opening 23 of the brace 21 and is supported thereby. It will thus be seen, that the elevation of the end 26 of the arm 25 may be varied by adjusting the strap 17 relatively to the standard 14 and the angle of the arm 25 may be varied by adjusting the brace 21 relatively to the strap 17. After these adjustments have been made, the fastenings 18 and 19 may be tightened to retain the parts in adjusted position.

As best seen in Figure 6, the opposite end of the arm 25 is bent substantially at right angles to its intermediate portion and extends in the same direction as the end 26. A hub 29 is journaled on the end 28, which forms an axle portion, and is held in position thereon by means of a cotter pin, or similar fastening 30 which extends through the axle portion 28 adjacent its free end, and by a washer 31 which is disposed between the outer end of the axle portion 28 and the cotter pin 30. A hub cap 32 is detachably mounted on the threaded outer end of the axle portion 28 and encloses the cotter pin 30 and washer 31. Hub cap 32 is provided with a grease connection 33 by means of which the axle portion and hub may be lubricated without being removed. A bushing 34 is mounted on the portion 28, adjacent its inner end and secured in adjusted position relatively thereto by a set screw 55.

35, as best seen in Figures 3 and 4. Bushing 34 is partially disposed in a recess 36 in the hub 29 to cooperate with the hub cap 32 and washer 31 to prevent lateral movement of the hub relatively to the axle portion. Hub 29 is provided with four equally spaced radially projecting supporting flanges or arms 37 to each of which is secured a blade 38, as by means of the fastenings 39. Blades 38 extend outwardly beyond the flanges 37 and have their free ends 40 curved in the same direction, as best seen in Figures 3 and 5.

In Figure 2, a slightly modified form of the damming attachment, designated 15', is shown. The attachment 15' is similarly mounted to the damming attachment 15 by means of a bracket 16. An arm 25', on its outer end, is provided with a socket 41 to which is connected an axle 42, which replaces the axle portion 28. Hub 29', which is journaled on the axle 42, is provided with the integrally formed outwardly projecting blades 38' which are likewise disposed in equally spaced relationship to each other at angles of substantially ninety degrees. Blades 38' have their outer ends 40' curved similarly to the ends 40. In order to reinforce the blades 38', the braces 43 are provided. Each of the braces 43 has an end 44 secured by means of the fastenings 45 to a blade 38', adjacent its inner end, and an opposite angularly disposed end 46 which is disposed to abut against the opposite side of an adjacent blade 38'. It will thus be seen, that a portion 44 of a brace 43 is secured to a corresponding side of each of the blades 38' and a portion 46 of a brace 43 abuts against the opposite side of each of the blades to prevent the blades from bending, at their inner ends, relatively to each other. The attachment 15' is adapted to be similarly disposed on a gang plow 10 to the attachment 15 and operates in the same manner.

The damming attachment 15 is adapted for use with gang plows having plowshares provided with moldboards, and when used with a gang plow, as illustrated, having three shares, the attachment is mounted on the standard of the center share. It is to be understood, that on larger gang plows a number of the attachments 15 or 15' may be employed, these attachments being mounted on the second, fourth and sixth standards, and so forth, for a reason which will hereinafter become apparent. As best seen in Figure 2, the attachment 15 or 15' is disposed at an oblique angle to the direction of movement of the gang plow 10 and behind and to one side of the moldboard of the share 12 so that the blades 38 are disposed substantially behind the plowshare 13. The blades 38 may be adjusted vertically by adjusting the bracket 16, as heretofore explained, so that the lower blade will be disposed in the furrow formed by the share 13 and will form an abutment for the soil being thrown off of the moldboard of the share 12. This soil, not shown, will be scraped along in the furrow, formed by the share 13, by the lowermost blade 38 until said blade is turned sufficiently by the soil in a clockwise direction, as seen in Figure 1, to release the soil and to position the blade, disposed adjacent thereto, in a counterclockwise direction, in a lowermost position to form an abutment for the soil. The next blade which is then disposed in a depending position will begin to collect the soil from the moldboard of the share 12 in the same manner to repeat the operation, and each of the blades 38 will form in this manner a depression or cavity, not shown, in the earth which will be substantially in a straight line behind the plow 13 and in spaced apart relationship to adjacent cavities or depressions. It will thus be seen that the attachment 15 or 15' will operate automatically to form dams and depressions or cavities at substantially equally spaced points in which surface water will be accumulated and held.

Various modifications and changes in the construction and arrangement of the parts forming the invention are contemplated and may obviously be resorted to.

I claim as my invention:

1. A damming attachment for moldboard plows comprising an arm adjustably connected at one end to a plow standard, the opposite end of said arm being angularly disposed relatively to its intermediate portion, and a plurality of radially disposed blades projecting from and rotatably mounted on said last mentioned end, said blades as a unit being disposed behind the rear end of the moldboard and substantially in a plane therewith so that the soil therefrom will be directed against the lowermost blade for thereby turning the blades for forming dams.

2. A device as in claim 1, said blades being disposed to one side of said moldboard and obliquely to the direction of movement of the plow.

3. A damming attachment for plows comprising an arm adjustably connected to a plow standard, said arm having a free end disposed at an angle to its intermediate portion, a plurality of blades rotatably mounted on said free end and radially disposed relatively thereto, said blades being in substantially equally spaced relationship relatively to each other, said blades having curved free ends, and being disposed rearwardly and to one side of a plowshare whereby soil therefrom will be directed against the lowermost blade for turning the blades for forming spaced ridges or dams.

4. A device as in claim 3, comprising a brace removably connected to said arm intermediate of its ends, and having one end adjustably connected to the standard for angularly adjusting the arm relatively to the standard.

5. A field damming attachment for moldboard plows comprising a lever, the ends of said lever being angularly disposed relatively to its intermediate portion, one of said ends being pivotally and removably connected to a plow standard, a bearing journaled on the opposite end of said lever and provided with radially projecting brackets, blades secured to and projecting outwardly from said brackets, said blades being disposed rearwardly and to one side of a moldboard of a plow and positioned so that the soil therefrom will be directed against the lowermost blade so that said blades will be rotated by the weight of the soil to form spaced dams.

6. A device as in claim 5, comprising a brace removably connected to the intermediate portion of said lever and slidably connected to the plow standard for adjustably mounting the blades.

7. A device as in claim 5, each of said brackets being removably secured to one of said blades and being provided with an outwardly projecting portion for bracing another of said blades.

8. An attachment for gang plows comprising an arm pivotally connected at one end thereof to a plow standard and projecting rearwardly therefrom at an oblique angle to the direction of movement of the plow, the opposite, free end of the arm being disposed substantially at a right angle to the intermediate portion of the arm and in substantially a horizontal plane, a hub rotatably mounted on the free end of said arm, a plurality of blades secured to and projecting radially therefrom, said blades being disposed behind and to one side of the moldboard of a plow, attached to said standard, and directly behind another plow of the gang plow, and a brace for supporting the arm, said brace being adjustably mounted on said standard for adjusting the elevation of the blades to arrange the blades so that the soil will be directed, from said moldboard, against the lowermost blade, to revolve the blades and to form spaced depressions or cavities in the earth behind the last mentioned plow.

CHARLES A. VRATIL.